United States Patent
Wolter et al.

(10) Patent No.: US 12,523,489 B2
(45) Date of Patent: Jan. 13, 2026

(54) METHOD FOR ASCERTAINING AN ATTRIBUTE ON A DIGITAL MAP FOR A VEHICLE

(71) Applicant: Robert Bosch GmbH, Stuttgart (DE)

(72) Inventors: Jan Wolter, Hannover (DE); Roland Homeier, Wennigsen (DE)

(73) Assignee: Robert Bosch GmbH, Stuttgart (DE)

( * ) Notice: Subject to any disclaimer, the term of this patent is extended or adjusted under 35 U.S.C. 154(b) by 30 days.

(21) Appl. No.: 17/663,718

(22) Filed: May 17, 2022

(65) Prior Publication Data

US 2022/0381576 A1 Dec. 1, 2022

(30) Foreign Application Priority Data

May 31, 2021 (DE) ...................... 10 2021 205 517.6

(51) Int. Cl.
*G01C 21/36* (2006.01)
(52) U.S. Cl.
CPC .................................. *G01C 21/367* (2013.01)
(58) Field of Classification Search
None
See application file for complete search history.

(56) References Cited

U.S. PATENT DOCUMENTS

| | | | | |
|---|---|---|---|---|
| 2002/0161513 | A1* | 10/2002 | Bechtolsheim .... | G01C 21/3667 701/454 |
| 2009/0138497 | A1 | 5/2009 | Zavoli et al. | |
| 2011/0098912 | A1 | 4/2011 | Baselau et al. | |
| 2012/0065879 | A1* | 3/2012 | Adachi .................. | G01C 21/30 701/409 |
| 2012/0271540 | A1 | 10/2012 | Miksa et al. | |
| 2013/0103302 | A1* | 4/2013 | T'siobbel ........... | G01C 21/3844 701/409 |
| 2015/0153197 | A1 | 6/2015 | Denaro | |
| 2016/0076905 | A1* | 3/2016 | Broadbent ......... | G01C 21/3697 701/414 |
| 2017/0268900 | A1* | 9/2017 | Nicolaas ............ | G01C 21/3697 |
| 2018/0023959 | A1 | 1/2018 | Ivanov et al. | |
| 2018/0106631 | A1* | 4/2018 | Myers ................ | G01C 21/3415 |
| 2018/0135992 | A1* | 5/2018 | Kamata ............. | G06Q 30/0281 |

FOREIGN PATENT DOCUMENTS

| | | |
|---|---|---|
| DE | 102015216916 A1 | 3/2017 |
| DE | 102016214028 A1 | 2/2018 |
| DE | 102019200145 A1 | 7/2020 |
| EP | 2459968 A1 | 6/2012 |
| EP | 3112802 B1 | 10/2019 |
| WO | 2011012347 A1 | 2/2011 |

* cited by examiner

*Primary Examiner* — James M Mcpherson
*Assistant Examiner* — Bakari Underwood
(74) *Attorney, Agent, or Firm* — Norton Rose Fulbright US LLP (57) ABSTRACT

A method for assigning a map attribute in an digital map for a vehicle. The method includes: ascertaining a validity range of the map attribute stored in absolute coordinates in relation to a reference line of the digital map; at least one base point of a defined geometry being ascertained originating from the map attribute using a defined segment of the reference line of the vehicle; and the map attribute being assigned to the defined segment intersected at the base point.

15 Claims, 6 Drawing Sheets

METHOD FOR ASCERTAINING AN ATTRIBUTE ON A DIGITAL MAP FOR A VEHICLE

CROSS REFERENCE

The present application claims the benefit under 35 U.S.C. § 119 of German Patent Application No. DE 10 2021 205 517.6 filed on May 31, 2021, which is expressly incorporated herein by reference in its entirety.

FIELD

The present invention relates to a method for ascertaining an attribute on a digital map for a vehicle. The present invention furthermore relates to a device for ascertaining an attribute on a digital map for a vehicle. The present invention furthermore relates to a computer program product.

BACKGROUND INFORMATION

The electronic horizon of a road vehicle originating from the present location has been used for some time as the basis for various assistance or information functions in a vehicle and is used in present projects for automated driving for the purpose of providing pieces of information from a digital roadmap to further control units, for example, with centimeter accuracy. The standardized ADASISv3 protocol is used to supply the horizon, which is distinguished in that the position of a map attribute is specified as an offset with centimeter accuracy along a path of the horizon.

European Patent No. EP 2 459 968 A1 describes an electronic horizon for a driver assistance system.

German Patent Application No. DE 10 2016 214 028 A1 describes a method for determining a position of a mobile unit, in which an estimated position of the mobile unit is detected and reference map data are retrieved on the basis of the detected estimated position, the reference map data including reference positions of landmarks.

European Patent Application No. EP 3 112 802 B1 describes a road feature measuring device and road feature measuring method for improved control of motor vehicles.

SUMMARY

An object of the present invention is to provide an improved method for ascertaining an attribute of a high-resolution digital map.

The object may achieved according to a first aspect by a method for assigning a map attribute in a digital map for a vehicle in accordance with the present invention. In accordance with an example embodiment of the present invention, the method includes the following steps:
  ascertaining a validity range of the map attribute stored in absolute coordinates with respect to a reference line of the digital map;
  at least one base point of a defined geometry being ascertained originating from the map attribute including a defined segment of the reference line of the vehicle; and
  the map attribute being assigned to the defined segment intersected at the base point.

In this way, map attributes are mapped on a reference line. The high-resolution digital map may thus advantageously be used, for example, for high-precision applications, for example, within the scope of automated driving, for example, on expressways, highways, in urban areas, etc. For example, the method may be carried out at a central location (for example in the cloud), sections from the digital map each being transmitted to the vehicle.

The provided method in accordance with an example embodiment of the present invention may be carried out on a control unit in the vehicle. Alternatively or additionally thereto, the provided method may already be carried out during the creation of the digital map. Another conceivable exemplary use is also a digital map including map attributes which specify an infrastructure for electric vehicles (e.g., charging stations, devices for calculating the range using present battery charge on the basis of the road condition, etc.). The provided method advantageously supplies a correct mapping result, in contrast to the conventional nearest neighbor approach, which is explained in more detail below. The offset-based position of the map attribute is therefore calculated correctly and more efficiently with the aid of the provided method, by which, for example, an electronic horizon may be generated, with the aid of which automated driving may be better implemented beyond the expressway and in particular in urban surroundings.

The object may be achieved according to a second aspect of the present invention by a device for assigning a map attribute in a digital map for a vehicle which carries out the provided method. This may take place, for example, on an electronic control unit on which the provided method is carried out within various software applications.

According to a third aspect of the present invention, the object may be achieved by a computer program product including program code means for carrying out the provided method when it runs on a provided electronic device or is stored on a computer-readable data carrier.

Advantageous refinements of the method in accordance with the present invention are disclosed herein.

One advantageous refinement of the method of the present invention provides that a position of the map attribute on a segment of the reference line is ascertained. The high-resolution digital map may thus use mapped map attributes very accurately, by which, for example, high-accuracy automated driving of the vehicle is supported well.

Another advantageous refinement of the method of the present invention provides that an offset of the map attribute on the reference line is ascertained from the ascertained position of the map attribute. In this way, the use of the provided method in an electronic horizon is implemented, which is useful in particular during trips of automated vehicles on expressways, heavily traveled highways, and other roads.

Another advantageous refinement of the method of the present invention provides that the intersection point is ascertained with the aid of concentric circles becoming larger in a defined manner or with the aid of defined rays originating from the map attribute. In this way, geometric principles which are simple to carry out are used for the accurate ascertainment of the assignment of the map attribute to the reference line.

Another advantageous refinement of the method of the present invention provides that a lane center of a roadway is used as the reference line. This is useful in particular in multilane roadways, to thus enable an accurate assignment of the map attribute to the traveled lane.

Another advantageous refinement of the method of the present invention provides that for the case in which two segments are intersected, lengths of the intersected segments are ascertained, the map attribute being assigned to the segment having the greatest distance. A unique assignment of the map attribute to the reference line is advantageously assisted in this way.

Another advantageous refinement of the method of the present invention provides that in the case in which two segments of the reference line have the same distance to the map attribute, the map attribute is assigned to the segment in the travel direction of the vehicle. A travel direction of the vehicle may advantageously also be used to carry out the method in this way.

Another advantageous refinement of the method of the present invention provides that the method is carried out during the creation of the digital map, on a control unit or in the cloud. A versatile possible use of the provided method is thus advantageously assisted.

The present invention is described in more detail hereinafter including further features and advantages on the basis of multiple figures. All features described or shown form the subject matter of the present invention as such or in any combination, regardless of their wording or representation in the description or in the figures.

Described features and advantages of the method result similarly from described features and advantages of the device and vice versa.

DETAILED DESCRIPTION OF EXAMPLE EMBODIMENTS

The term "automated vehicle" is used synonymously hereinafter with the terms "fully automated vehicle," "autonomous vehicle," "semiautonomous vehicle," "E-vehicle," and other driver assistance functions.

Figure 1:
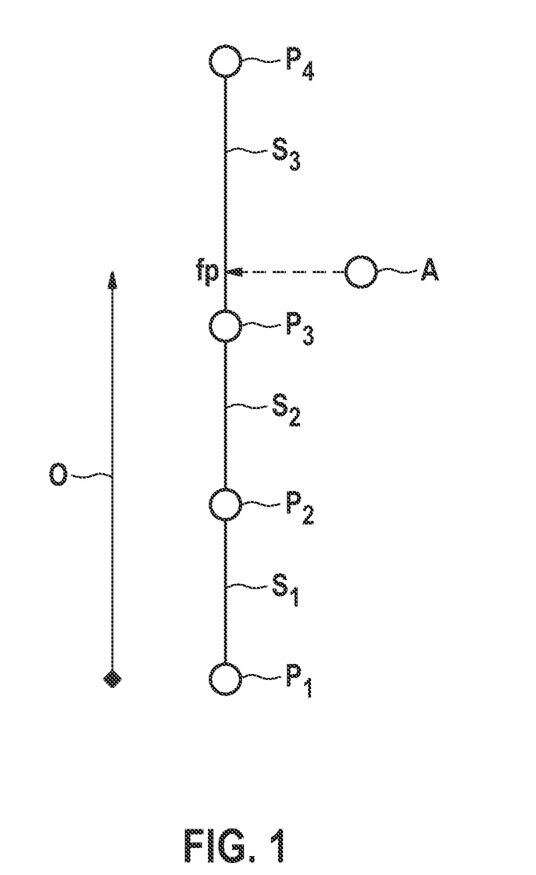
FIG. 1 shows a representation of fundamental features of the provided method of an example embodiment of the present invention.

FIG. 1 explains fundamental features of the provided method.

An offset O (for example, a distance from a defined position of the vehicle on a reference line including multiple strung together segments $S_1 \ldots S_n$) of a map attribute A may not be read out directly from a high-resolution digital map, but rather has to be ascertained by computer based on a reference line representing the road geometry (for example, in the form of a lane reference line) and the position of map attribute A stored in absolute coordinates in the map. Offset O advantageously does not necessarily have to be ascertained beginning from the vehicle position, but rather may be ascertained beginning from an arbitrarily defined point. A geometry of the reference line is recognizable including shape points $P_1 \ldots P_n$, whose connections are referred to as segments $S_1 \ldots S_n$, and a map attribute A, which is mapped orthogonally on the reference line, for example, to create an electronic horizon for the vehicle (not shown), in order to thus ascertain a base point $f_p$ and therefrom offset O (distance of shape point $P_1$ to base point $f_p$).

A conventional algorithm for determining offset O may be expressed as follows in pseudocode:
1. Iterate over all segments $S_i$
2. Calculate base point $f_p$ between map attribute A and segment $S_i$ and calculate distance d between the two points
3. If distance d is less than distance d ascertained in the prior iteration, overwrite distance d and also store base point $f_p$
4. After the end of the loop over all segments $S_i$, nearest base point $f_p$ is known
5. Calculate offset O as distance d between shape point $P_1$ and base point $f_p$ along the segments This algorithm, which is known per se, may be inefficient, however, since it is necessary to iterate over all segments $S_1 \ldots S_n$ of the geometry. A so-called "nearest neighbor method," which is known per se, is therefore often used, which may significantly reduce the segments coming into consideration, using which a base point $f_p$ has to be calculated.

Figure 2A:
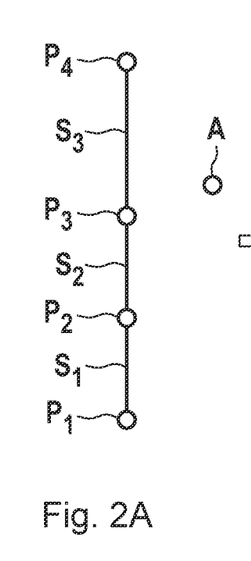
FIGS. 2A-2E show an explanation of the conventional nearest neighbor method.
Figure 2B:
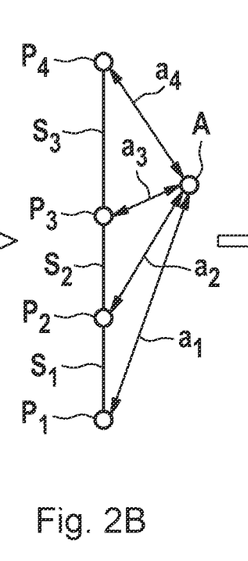
Figure 2C:
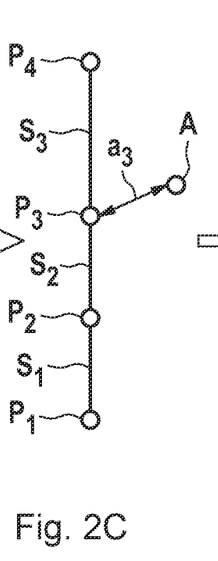
Figure 2D:
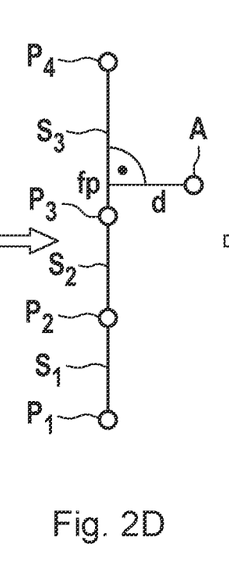
Figure 2E:
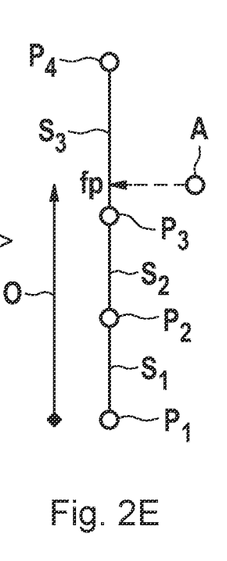

FIGS. 2A-2E outline, in five images A through E, a mapping according to the conventional nearest neighbor approach, which may be expressed as follows in pseudocode:
1. Calculate distances $a_i$ between map attribute A and shape points $P_i$ (FIGS. 2A, 2B)
2. Select from these distances $a_i$ shape point $P_i$ of the reference line having the least distance and use exclusively segments $S_{i-1}$ and $S_i$ associated with this shape point to calculate base point $f_p$ (FIG. 2C)
3. Calculate base point $f_p$ in which map attribute A is orthogonally mapped on the segment (FIG. 2D)
4. Calculate offset O (FIG. 2E)

The explained conventional nearest neighbor method is not capable, however, in certain situations, for example, on very curvy roads, as occur in urban areas, or on serpentines in the mountains, under certain circumstances of calculating the correct mapping of map attribute A, because mapping is carried out on incorrect segments.

A method is therefore provided for improved calculation of offsets O in relation to map attributes A in the supply of an electronic horizon for control units (for example, in autonomous or semi-autonomous motor vehicles, E-vehicles, etc.).

The background of the provided method is that offset O may not be read out directly from the digital map, but rather has to be ascertained by computer based on a reference line representing the road geometry and the position of map attribute A (for example, tunnel, speed limits, etc.). The geometry of the reference line is made up of shape points $P_1 \ldots P_n$, whose connections are called segments $S_0 \ldots S_n$.

Map attribute A is mapped orthogonally on this geometry to create the electronic horizon. Various procedures or algorithms are possible for calculating offset O, the above-explained conventional methods being inefficient or possibly supplying incorrect results in certain situations.

Figure 3A:
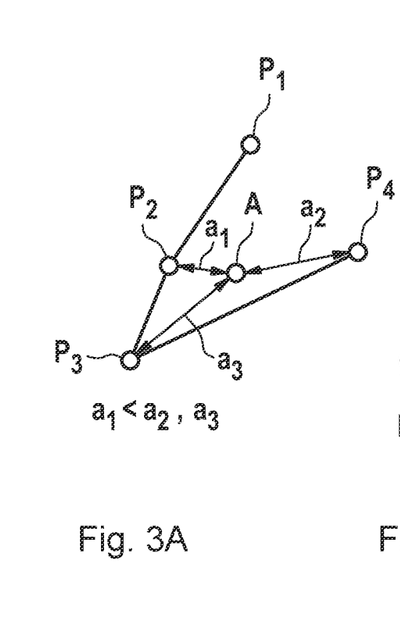
FIG. 3A-3D show a schematic representation of a mode of operation of the provided method in accordance with an example embodiment of the present invention.
Figure 3B:
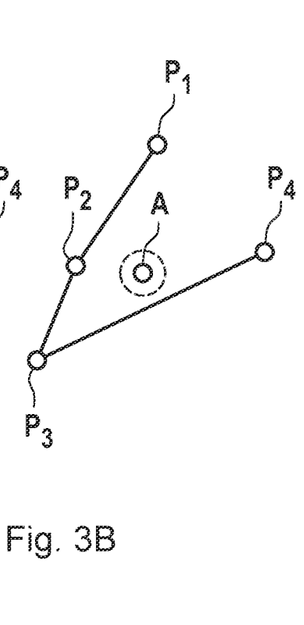
Figure 3C:
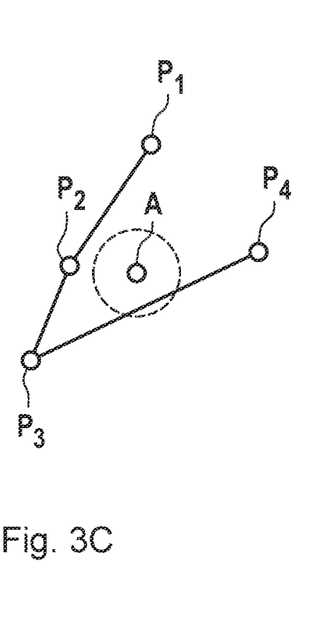
Figure 3D:
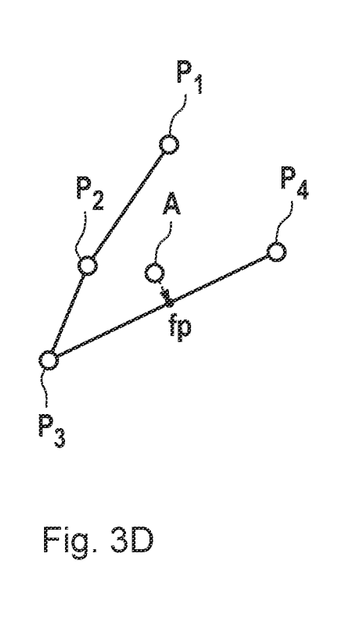
Figure 4A:
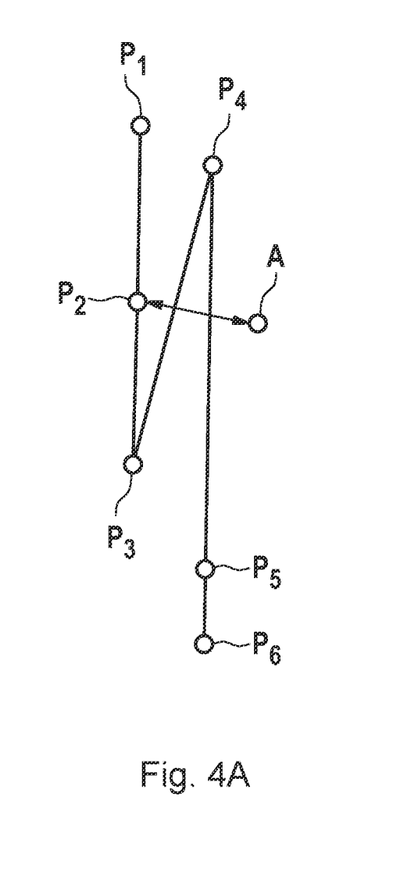
FIGS. 4A-4D show a schematic representation of another specific example embodiment of the provided method in accordance with the present invention.
Figure 4B:
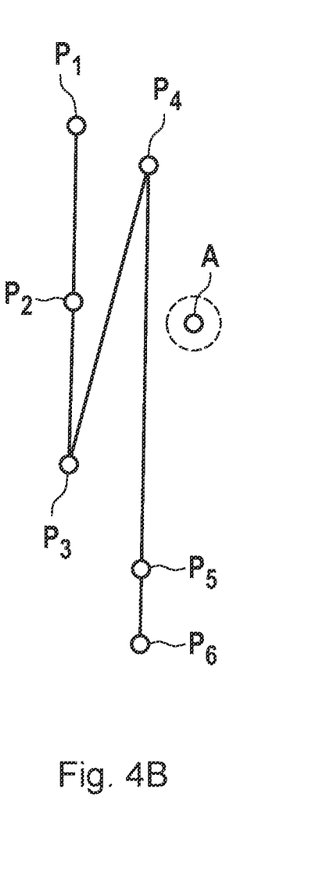
Figure 4C:
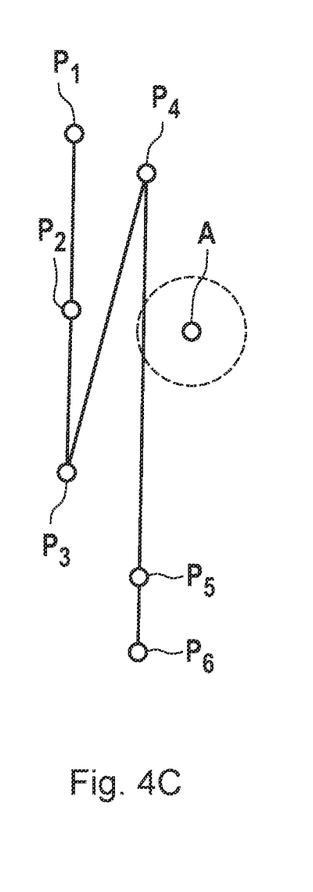
Figure 4D:
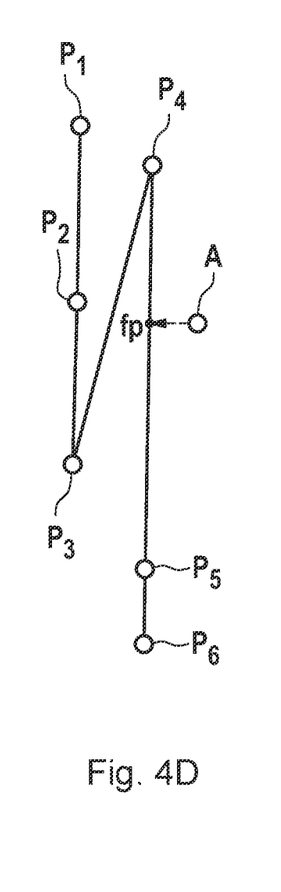

In particular, the conventional nearest neighbor method may calculate incorrect offsets O on sharply curved roads or serpentines. In the nearest neighbor method, firstly the distances between map attribute A and the shape points are calculated, only the shape point having the least distance being used for calculating base point $f_p$ orthogonally on the corresponding segment. It is apparent in FIG. 3A that distance a1 is less than distances a2 and a3, in this case map attribute A would be mapped on an "incorrect" segment of the reference line.

The provided method avoids the disadvantages of the nearest neighbor method in that, for example, a concentric circle around map attribute A is enlarged until it intersects a segment as indicated in principle in one specific embodiment of the provided method in FIGS. 3A-3D using four images A through D.

Figure 5A:
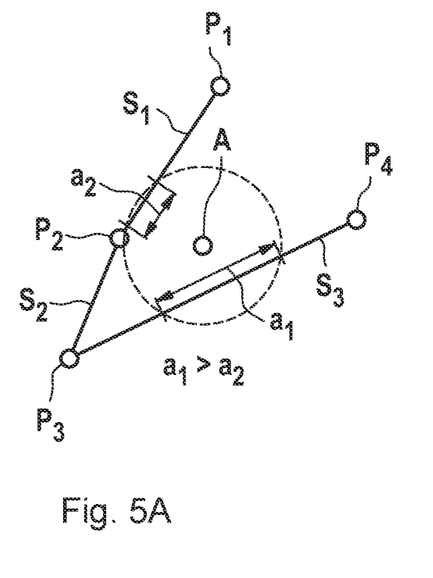
FIGS. 5A and 5B show a schematic representation of another specific example embodiment of the provided method, in accordance with the present invention.
Figure 5B:
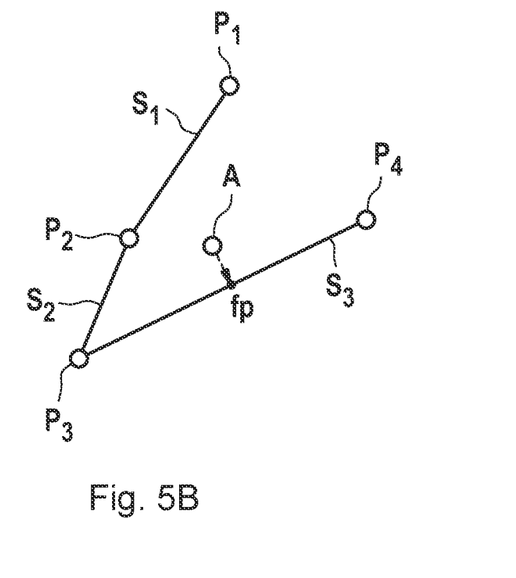

The segment intersected by the concentric circle is subsequently used as the basis for the calculation of base point $f_p$ and offset O. If the concentric circle should intersect multiple segments $S_1 \ldots S_n$, nonetheless the nearest segment may be determined. For this purpose, for each of the intersected segments, the distance of the two intersection points with the circle has to be determined. That segment in which the distance is greatest is nearest to map attribute A and is selected. It is indicated in FIG. 5A that segment S3 is the one at which distance a1 is greater than distance a2. Therefore, segment S3, which is intersected by the circle, is selected and assigned to map attribute A at base point $f_p$, as indicated in FIG. 5B.

Alternatively to the use of concentric circles, the use of two-dimensional ray casting is also possible. In this ray casting approach, rays are drawn originating from map attribute A and intersected with segments, nearest segment including base point $f_p$ and offset O being able to be determined from their distance to the segments.

Several map attributes A are listed solely as examples hereinafter, which may be mapped on the reference line:
 Fixed map attributes, for example, tunnels on roads
 Flexible map attributes, for example, speed limits on roads
 Lane groups including their lanes and their lane markings
 Landmarks or locating objects
 Referencing objects for updating attributes
 Charging stations (for E-vehicles)
 Devices for calculating the range using present battery charge on the basis of the road condition (for E-vehicles)

Map attributes A which are mentioned and others which are not mentioned occur in large numbers in the digital map, so that the mapping operation including the following improvement is often used. For a 1 km long horizon, for example, there may be approximately 1000 to 2000 map attributes for which the corresponding mapping calculations have to be carried out.

The procedure in the described method is indicated in FIGS. 3A-3D and 4A-4D and shows how it may solve the problem cases of the nearest neighbor method. In particular in the scenario of FIGS. 4A-4D, the conventional nearest neighbor method would probably supply incorrect results.

The algorithm operates in principle as follows:
 1. Draw concentric circles around map attribute A which become larger until they intersect a segment of the reference line
 2. Use the identified segment for the orthogonal mapping and calculate base point $f_p$
 3. Calculate offset O on the reference line The last two steps do not differ from those of the known nearest neighbor method. The advantage over the nearest neighbor method results from the first step, since the testing by the intersection with the concentric circles relates directly to the segments and not initially only to the shape points.

FIGS. 5A and 5B explains a variant of the provided method:

If the concentric circle originating from map attribute A in step 1 should intersect multiple segments at the same time, the nearest segment may nonetheless be determined, as indicated in FIG. 5B. For this purpose, for each of the intersected segments, the distance of the two intersection points with the circle has to be determined. That segment in which the distance is greatest is nearest to map attribute A and is selected for base point $f_p$. In the case of FIG. 5A, segment $a_1 > a_2$, because of which map attribute A is mapped on segment $S_1$ in FIG. 5B.

An alternative approach (not shown in the figures) to find the nearest segment in step 1 is the use of two-dimensional ray casting instead of the above-described concentric circles. In this ray casting approach (similarly to corresponding approaches in computer graphics), rays would originate starting from map attribute A, by whose distance to the segments the nearest segment of the reference line intersected by a ray may be determined.

Figure 6A:
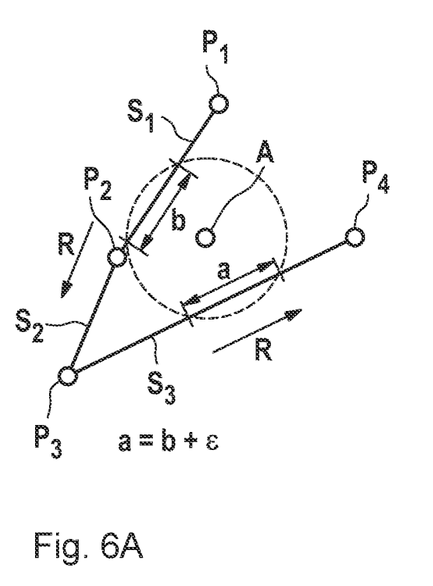
FIGS. 6A and 6B show a schematic representation of another specific example embodiment of the provided method in accordance with the present invention.
Figure 6B:
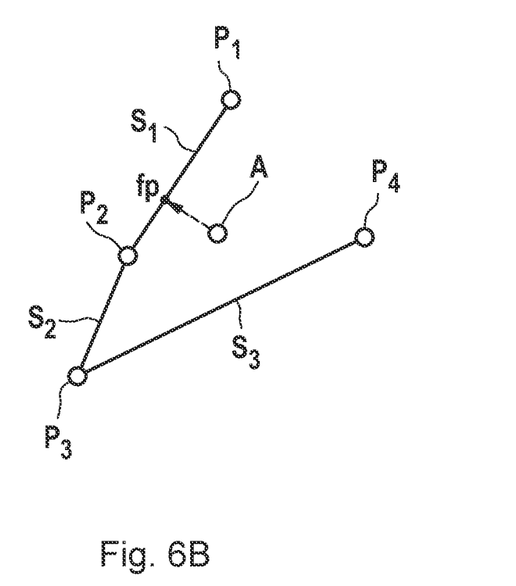

In case of an equidistance of tangential segments to map attribute A, a travel direction R may advantageously be taken into consideration. In this case, that segment is selected on which the vehicle will soon be located or on which the vehicle will soon travel.

This scenario is indicated in FIG. 6A, where a travel direction R of the vehicle is indicated. It is apparent in FIG. 6B that due to the equidistance of map attribute A to intersected segments S1, S3, map attribute A is assigned due to travel direction R of the vehicle to segment S1, because the vehicle will travel earlier on segment S1 than segment S3. An uncertainty value ε is also taken into consideration as the equidistance, i.e., a=b+ε.

Figure 7:
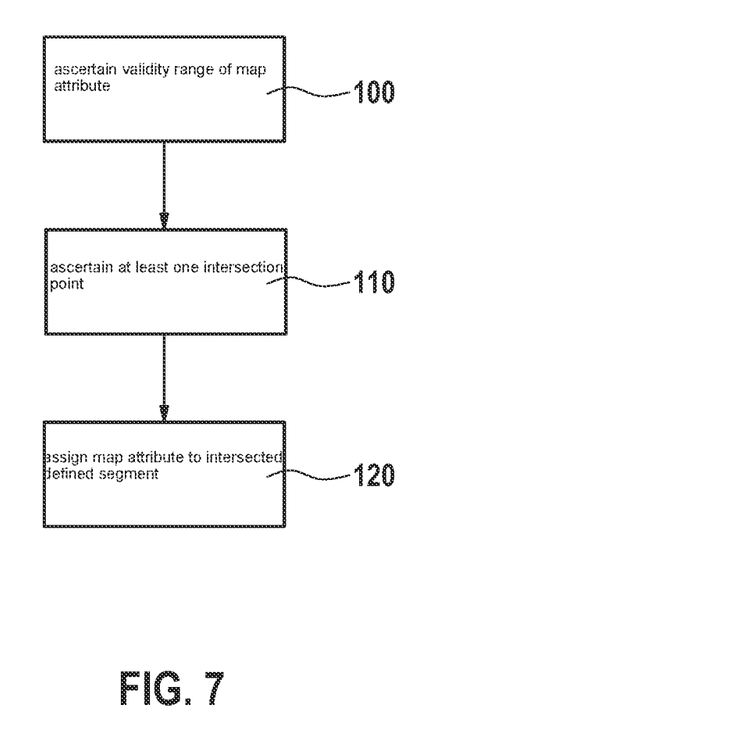
FIG. 7 shows a schematic sequence of a specific example embodiment of the provided method in accordance with the present invention

FIG. 7 very schematically shows a schematic sequence of a provided method.

In a step 100, a validity range of map attribute A stored in absolute coordinates is ascertained in relation to a reference line of the digital map.

In a step 110, at least one intersection point of a defined geometry originating from map attribute A with a defined segment $S_1 \ldots S_n$ of the reference line of the vehicle is ascertained.

In a step 120, map attribute A is assigned to intersected defined segment $S_1 \ldots S_n$.

The provided method may advantageously be carried out locally in a control unit in the vehicle or centrally in the cloud. When the method is carried out, for example, a travel direction may also be taken into consideration, so that segments of the digital map including base point fp [sic; $f_p$] already previously ascertained are transmitted to the vehicle.

The provided method may advantageously be implemented as software, which runs, for example, decentrally on a control unit in the vehicle or centrally in the cloud. Simple adaptability of the method is assisted in this way.

The provided method may advantageously be carried out in the cloud, the calculations in the cloud advantageously only being carried out a single time (for example, until the next map update). In the vehicle, the method is carried out during each trip, because in general highly updated, most recent map attributes are requested.

Those skilled in the art will modify the features of the present invention in a suitable way and/or combine them with one another, without departing from the core concept of the present invention.

What is claimed is:

1. A method for assigning a map attribute in a digital map for a vehicle, the method comprising:
    ascertaining a validity range of the map attribute stored in absolute coordinates in relation to a reference line of the digital map;
    ascertaining at least one base point of a defined geometry originating from the map attribute using a defined segment of the reference line;
    assigning the map attribute to the defined segment intersected at the base point;
    ascertaining an offset based on a reference line representing a road geometry and a position of the map attribute, wherein a geometry of the reference line is made up of shape points, wherein segments connect each pair of the shape points; and
    creating an electronic horizon including the map attribute, the creating of the electronic horizon including mapping the map attribute orthogonally on the defined geometry using the reference line and the ascertained offset;
    wherein the at least one base point is located on one of the segments, and wherein the offset is a distance from one of the shape points to the at least one base point;
    wherein the one of the segments on which the base point is located is ascertained by:
        determining a concentric circle around the around the map attribute, the concentric circle being concentric with the map attribute,
        enlarging the concentric circle until the concentric circle intersects at least one segment of the segments, and
        ascertaining the one of the segments on which the base point is located as one of the at least one segments which the concentric circle intersects; and
    wherein the method further comprises driving autonomously, by the vehicle, using the created electronic horizon.

2. The method as recited in claim 1, wherein the position of the map attribute is ascertained on a particular segment of the reference line.

3. The method as recited in claim 2, wherein the offset of the map attribute on the reference line is ascertained from the ascertained position of the map attribute.

4. The method as recited in claim 1, wherein a lane center of a roadway is used as the reference line.

5. The method as recited in claim 1, wherein for when two segments are intersected, lengths of the intersected segments are ascertained, and the map attribute is assigned to the segment having the greatest distance.

6. The method as recited in claim 1, wherein when two segments of the reference line have the same distance to the map attribute, the map attribute is assigned to that segment of the two segments in a travel direction of the vehicle.

7. The method as recited in claim 1, wherein the intersection point is ascertained using defined rays originating from the map attribute, and wherein the method is carried out during creation of the digital map, on a control unit or in the cloud.

8. The method as recited in claim 1, wherein the map attribute includes at least one of a plurality of attributes, including at least one of:
    a fixed map attribute, including at least a tunnel;
    a flexible map attribute, including at least a speed limit;
    a lane group, including lanes and lane markings;
    a landmark or another locating object;
    a referencing object for updating an attribute; and/or
    a charging station.

9. The method as recited in claim 1, wherein, based on the concentric circle intersecting multiple segments of the segments, for each respective segment of the multiple segments, a respective distance is determined between points at which the concentric circle intersects the respective segment, and the one of the segments on which the base point is located is the respective segment having the largest respective distance relative to the other respective distances.

10. The method as recited in claim 1, wherein the method is carried out locally in the vehicle during each trip of the vehicle.

11. The method as recited in claim 1, wherein at least some of the steps of the method are carried out centrally in a cloud.

12. An apparatus to assign a map attribute in a digital map for a vehicle, comprising:
    a device configured to perform the following:
        ascertaining a validity range of the map attribute stored in absolute coordinates in relation to a reference line of the digital map;
        ascertaining at least one base point of a defined geometry originating from the map attribute using a defined segment of the reference line;
        assigning the map attribute to the defined segment intersected at the base point;
        ascertaining an offset based on a reference line representing a road geometry and a position of the map attribute, wherein a geometry of the reference line is made up of shape points, wherein segments connect each pair of the shape points; and
        creating an electronic horizon including the map attribute, the creating of the electronic horizon including mapping the attribute orthogonally on the defined geometry using the reference line and the ascertained offset;
        wherein the at least one base point is located on one of the segments, and wherein the offset is a distance from one of the shape points to the at least one base point;
        wherein the device is configured to ascertain the one of the segments on which the base point is located:
            determining a concentric circle around the around the map attribute, the concentric circle being concentric with the map attribute,
            enlarging the concentric circle until the concentric circle intersects at least one segment of the segments, and
            ascertaining the one of the segments on which the base point is located as one of the at least one segments which the concentric circle intersects;
        wherein the vehicle is configured to drive autonomously, using the created electronic horizon.

13. The apparatus as recited in claim 12, wherein, based on the concentric circle intersecting multiple segments of the segments, for each respective segment of the multiple segments, a respective distance is determined between points at which the concentric circle intersects the respective segment, and the one of the segments on which the base point is located is the respective segment having the largest respective distance relative to the other respective distances.

14. A non-transitory computer-readable data carrier, on which is stored a computer program, which is executable by a processor, comprising:
a program code arrangement having program code for assigning a map attribute in a digital map for a vehicle, the program code, when executed by the processor, causing the processor to perform the following steps:
ascertaining a validity range of the map attribute stored in absolute coordinates in relation to a reference line of the digital map;
ascertaining at least one base point of a defined geometry originating from the map attribute using a defined segment of the reference line;
assigning the map attribute to the defined segment intersected at the base point;
ascertaining an offset based on a reference line representing a road geometry and a position of the map attribute, wherein a geometry of the reference line is made up of shape points, wherein segments connect each pair of the shape points; and
creating an electronic horizon including the map attribute orthogonally on the defined geometry using the reference line and the ascertained offset
wherein the at least one base point is located on one of the segments, and wherein the offset is a distance from one of the shape points to the at least one base point;
wherein the one of the segments on which the base point is located is ascertained by:
determining a concentric circle around the around the map attribute, the concentric circle being concentric with the map attribute,
enlarging the concentric circle until the concentric circle intersects at least one segment of the segments, and
ascertaining the one of the segments on which the base point is located as one of the at least one segments which the concentric circle intersects; and
wherein the program code, when executed by the processor, further causes the processor to perform:
autonomous driving, by the vehicle, using the created electronic horizon.

15. The non-transitory computer-readable data carrier as recited in claim 14, wherein, based on the concentric circle intersecting multiple segments of the segments, for each respective segment of the multiple segments, a respective distance is determined between points at which the concentric circle intersects the respective segment, and the one of the segments on which the base point is located is the respective segment having the largest respective distance relative to the other respective distances.

* * * * *